US010798468B2

(12) United States Patent
Bokowski et al.

(10) Patent No.: US 10,798,468 B2
(45) Date of Patent: Oct. 6, 2020

(54) METHOD AND SYSTEM FOR PRESENTING GAME-RELATED INFORMATION

(71) Applicant: Scorevision, LLC, Omaha, NE (US)

(72) Inventors: Chad Bokowski, Omaha, NE (US); David Sutter, Omaha, NE (US); Corey Spitzer, Omaha, NE (US); Gordon Whitten, Omaha, NE (US)

(73) Assignee: Scorevision, LLC, Omaha, NE (US)

( * ) Notice: Subject to any disclaimer, the term of this patent is extended or adjusted under 35 U.S.C. 154(b) by 0 days.

(21) Appl. No.: 15/076,133

(22) Filed: Mar. 21, 2016

(65) Prior Publication Data

US 2016/0277812 A1 Sep. 22, 2016

Related U.S. Application Data

(60) Provisional application No. 62/136,269, filed on Mar. 20, 2015.

(51) Int. Cl.
*H04N 21/81* (2011.01)
*H04N 21/41* (2011.01)
(Continued)

(52) U.S. Cl.
CPC ......... *H04N 21/8133* (2013.01); *A63B 71/06* (2013.01); *G06F 3/14* (2013.01); *G09G 5/12* (2013.01); *G09G 5/14* (2013.01); *H04L 67/10* (2013.01); *H04N 21/4126* (2013.01); *H04N 21/41407* (2013.01); *H04N 21/4307* (2013.01); *H04N 21/4312* (2013.01);
(Continued)

(58) Field of Classification Search
CPC .......... H04N 21/8126; H04N 21/8133; H04N 21/4126; H04N 21/41407
See application file for complete search history.

(56) References Cited

U.S. PATENT DOCUMENTS 7,526,578 B2* 4/2009 Birchen ................ G06F 9/4411
710/10
8,066,572 B1* 11/2011 Timmons ................ H04L 67/38
273/239
(Continued)

OTHER PUBLICATIONS

International Search Report for Application No. PCT/US16/23453 dated Jun. 9, 2016, 11 pages.

*Primary Examiner* — Brian T Pendleton
*Assistant Examiner* — Frank Johnson
(74) *Attorney, Agent, or Firm* — Suiter Swantz pc llo

(57) ABSTRACT

The present application is a method and system for presenting game-related information. A system for presenting game-related information may include an initiator device, the initiator device including a computing device which includes an application executed by a processor of the computing devices to generate game-related information, a display device operably connected to the initiator device to display game-related information from the initiator device, and a cloud-based server device operably connected to the initiator device for receipt of the game-related information. The system for presenting game related information may include a receiver device, the receiver device including a computing device which includes an application executed by a processor of the computing device to receive the game-related information from the cloud-based server device.

20 Claims, 18 Drawing Sheets

(51) Int. Cl.

| | | |
|---|---|---|
| *A63B 71/06* | (2006.01) | |
| *H04L 29/08* | (2006.01) | |
| *G09G 5/12* | (2006.01) | |
| *H04N 21/414* | (2011.01) | |
| *H04N 21/4722* | (2011.01) | |
| *H04W 4/80* | (2018.01) | |
| *G06F 3/14* | (2006.01) | |
| *G09G 5/14* | (2006.01) | |
| *H04N 21/4363* | (2011.01) | |
| *H04N 21/431* | (2011.01) | |
| *H04N 21/43* | (2011.01) | |

(52) U.S. Cl.
CPC ... *H04N 21/43637* (2013.01); *H04N 21/4722* (2013.01); *H04N 21/812* (2013.01); *H04W 4/80* (2018.02); *G09G 2370/022* (2013.01); *G09G 2370/16* (2013.01)

(56) References Cited

U.S. PATENT DOCUMENTS

| | | | | |
|---|---|---|---|---|
| 9,247,282 | B1* | 1/2016 | Daniel | H04N 21/214 |
| 2002/0138163 | A1* | 9/2002 | MacPherson | A63B 71/0669 700/92 |
| 2003/0086123 | A1 | 5/2003 | Torrens-Burton | |
| 2003/0142238 | A1* | 7/2003 | Wasack | H04N 21/84 348/571 |
| 2003/0144017 | A1* | 7/2003 | Inselberg | A63F 13/12 455/517 |
| 2004/0080485 | A1* | 4/2004 | Altmaier | A63B 71/06 345/156 |
| 2005/0240872 | A1* | 10/2005 | Roeske | A63B 71/06 715/716 |
| 2005/0272496 | A1* | 12/2005 | Reinish | A63B 63/00 463/2 |
| 2006/0023117 | A1* | 2/2006 | Feldmeier | H04N 7/17318 348/441 |
| 2007/0016861 | A1 | 1/2007 | Salomaa et al. | |
| 2007/0136133 | A1* | 6/2007 | Li | G06Q 30/02 705/14.51 |
| 2008/0062318 | A1* | 3/2008 | Ellis | H04N 5/44543 348/564 |
| 2008/0227500 | A1* | 9/2008 | Heyworth | G06Q 30/0267 455/566 |
| 2009/0164569 | A1 | 6/2009 | Garcia et al. | |
| 2009/0322652 | A1* | 12/2009 | Adderton | H04L 51/04 345/2.3 |
| 2010/0103075 | A1 | 4/2010 | Kalaboukis et al. | |
| 2011/0013087 | A1* | 1/2011 | House | A63B 24/0021 348/564 |
| 2011/0018867 | A1 | 1/2011 | Shibamiya et al. | |
| 2011/0131520 | A1* | 6/2011 | Al-Shaykh | H04L 12/2807 715/772 |
| 2011/0157228 | A1* | 6/2011 | Ptucha | H04N 7/18 345/638 |
| 2011/0238853 | A1* | 9/2011 | Paul | H04N 21/4307 709/231 |
| 2011/0246579 | A1* | 10/2011 | Williams | A63B 71/06 709/206 |
| 2011/0280540 | A1* | 11/2011 | Woodman | H04N 5/765 386/201 |
| 2012/0189273 | A1* | 7/2012 | Folgner | H04N 9/8227 386/241 |
| 2012/0210348 | A1* | 8/2012 | Verna | H04N 5/781 725/25 |
| 2013/0070047 | A1* | 3/2013 | Digiovanni | H04N 5/222 348/36 |
| 2013/0120123 | A1* | 5/2013 | Aman | A63B 71/0669 340/323 R |
| 2013/0150988 | A1* | 6/2013 | Kuck | H04H 60/06 700/91 |
| 2013/0275868 | A1 | 10/2013 | Haussila et al. | |
| 2013/0298053 | A1 | 11/2013 | Sprang et al. | |
| 2014/0143687 | A1 | 5/2014 | Tan et al. | |
| 2014/0259708 | A1 | 9/2014 | Foster | |
| 2014/0288683 | A1* | 9/2014 | Sullivan | H04N 21/2187 700/92 |
| 2015/0052546 | A1* | 2/2015 | Ortiz | A63B 71/06 725/28 |
| 2015/0193172 | A1* | 7/2015 | Hokari | G06F 3/0604 709/213 |
| 2015/0217179 | A1* | 8/2015 | Olsson | A63B 71/0616 700/91 |
| 2016/0045810 | A1* | 2/2016 | Minkovitch | A63B 71/0669 348/157 |
| 2016/0213995 | A1* | 7/2016 | Huebsch | A63B 71/06 |

\* cited by examiner

METHOD AND SYSTEM FOR PRESENTING GAME-RELATED INFORMATION

CROSS REFERENCE TO RELATED APPLICATIONS

The present application claims the benefit under 35 U.S.C. § 119(e) of U.S. Provisional Application Ser. No. 62/136,269, filed Mar. 20, 2015. U.S. Provisional Application Ser. No. 62/136,269, filed Mar. 20, 2015 is incorporated by reference in its entirety.

TECHNICAL FIELD

The present disclosure generally relates to the field of content delivery, and more particularly to a method and system for presenting game-related information.

BACKGROUND

Conventional scoreboards commonly found in a high school gymnasium or youth sports venue typically include an electronic scorekeeping device with a key pad on a scorer's table and a wired or wireless connection to a fixed display scoreboard that hangs on the wall of a gym or arena and interprets the signals from the score keeper's device to display the game clock, score, and other pertinent game information. Conventional scoreboards are limited in the type of information that can be presented and the limited ability to view the conventional scoreboards. For example, a conventional scoreboard may only present information related to a score of the game, the section of the game, and the time remaining in the game.

SUMMARY

Accordingly, the present application is directed to a method and system for presenting game-related information. A system for presenting game-related information may include an initiator device, the initiator device including a computing device which includes an application executed by a processor of the computing device to generate game-related information, a display device operably connected to the initiator device to display game-related information from the initiator device, and a cloud-based server device operably connected to the initiator device for receipt of the game-related information. In an embodiment of the disclosure, the system for presenting game related information may include a receiver device, the receiver device including a computing device which includes an application executed by a processor of the computing device to receive the game-related information from the cloud-based server device.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Before any embodiments of the disclosure are explained in detail, it is to be understood that the embodiments may not be limited in application per the details of the structure or the function as set forth in the following descriptions or illustrated in the figures. Different embodiments may be capable of being practiced or carried out in various ways. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage. It is further contemplated that like reference numbers may describe similar components and the equivalents thereof.

Figure 1:
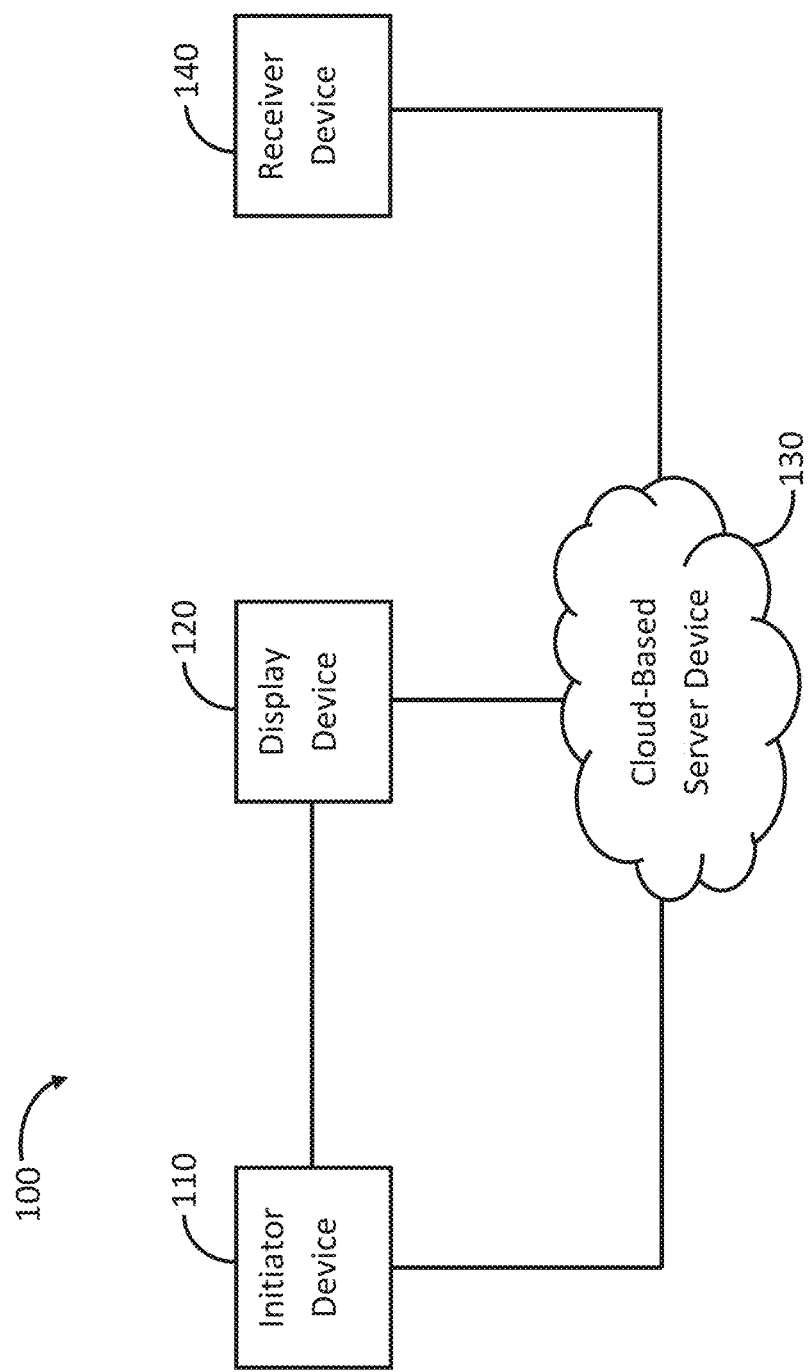
FIG. 1 depicts a block diagram of a system for presenting game-related information in accordance with an embodiment of the present disclosure.

Referring to FIG. 1, a block diagram of a system 100 for presenting game-related information in accordance with an embodiment of the present disclosure is shown. System 100 for presenting game-related information may include an initiator device 110. Initiator device 110 may include a computing device (e.g. a computer, laptop, tablet, smartphone and the like) which includes an application (e.g. an app) executed by a processor of the computing device to generate game-related information. It is contemplated that application may refer to one or more instructions, e.g. software, which may be executed by a processor or processing unit. It is contemplated that initiator device 110 may include a graphical user interface with pre-defined data entry input fields to facilitate data entry of game-related information by a user. System 100 may further include a display device 120 operably connected to the initiator device to display game-related information from the initiator device 110. Display device 120 may include a monitor, television, a plurality of televisions combined to form a single display, a LED display, a projector, and the like. It is contemplated that display device 120 may include a processor configured to execute one or more instructions, (e.g. an application) to receive game-related information and present the game-related information. Initiator device 110 may be operably connected with display device 120 via a network. Network may include a hard-wired connection or a wireless connection, such as WIFI or BLUETOOTH.

Figure 2:
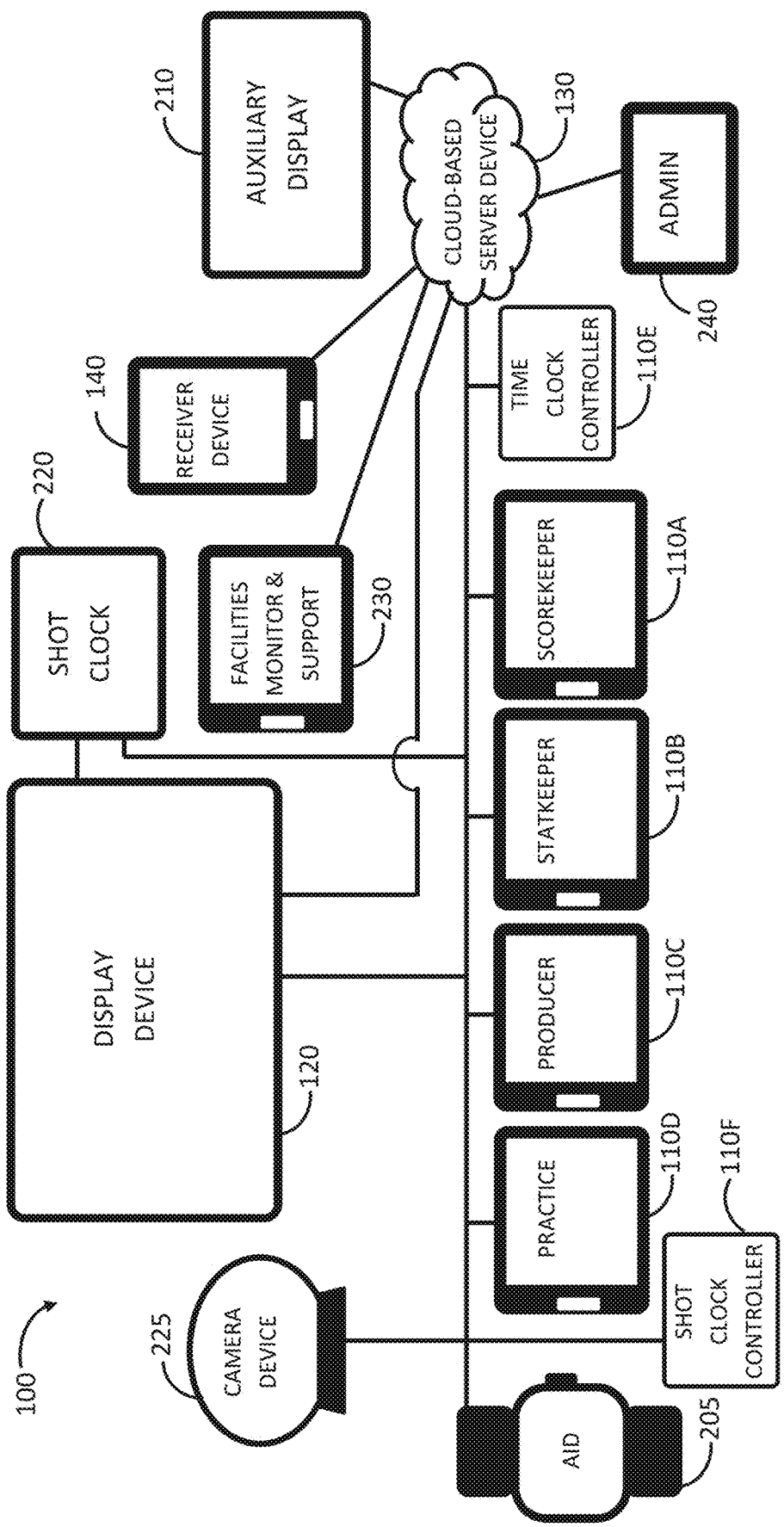
FIG. 2 depicts another block diagram of a system for presenting game related information in accordance with an embodiment of the present disclosure.

Display device 120, and auxiliary display 210 as shown in FIG. 2, may be configured to execute a list of instructions, such as a display application, to allow adoption of a variety of aspect ratios including 4:3, 3:2, 2:1 and 16:9. Display application may be a MacOS application in accordance with an embodiment of the present disclosure. Display device 120 and auxiliary display 210 may be a multimedia board display, such as in a form of LEDs or commercial-grade, high-definition monitors. The display application operating on display device 120 and auxiliary display 210 may be configured to track and record impressions of ads displayed in rotating sequences. Additionally, display application operating on display device 120 and auxiliary display 210 may be configured to perform a periodic check with the cloud-based server device 130 and may be configured to download new information (game, team, player, ad sequences, and the like) as it may become available. The display application may be configured to present a branding design that may wrap a game board (and alternative use content) and may be customized in one or more ways for each organization controlled through the initiator device 110C, known as the producer, and to be discussed further.

System 100 may include a cloud-based server device 130 which may be operably connected with initiator device 110 to receive game-related information. In an embodiment of the disclosure, system 100 may further include a receiver device 140. Cloud-based server device 130 may include a computing device (e.g. a computer, laptop, tablet, smartphone and the like) which includes a list of instructions (e.g. an application executed by a processor of the computing device to store game-related information. Cloud-based server device 130 may receive game-related information from initiator device 110 and from receiver device 140, facilities monitor and support 230, and admin device 240 as shown in FIG. 2 Receiver device 140 may be operably connected to the cloud-based server device 130. Receiver device 140 may include a computing device (e.g. a computer, laptop, tablet, smartphone and the like) which includes a list of instructions (e.g. an application) executed by a processor of the computing device to retrieve game-related information from the cloud-based server device 130. It is contemplated that receiver device 140 may include a graphical user interface with pre-defined data entry input fields to facilitate receipt of game-related information by a user and an interface for data input from a user to facilitate receipt of a type, or subset of game-related information. In one embodiment, receiver device 140 may include a mobile computing device, such as a laptop, tablet or smartphone which may include an integrated wireless transceiver to wirelessly connect to cloud-based server device 130.

Cloud-based server device 130 may be operably connected to the initiator device 110 for receipt of the game-related information, and retrieval of game-related information by receiver device 140. Initiator device 110 and receiver device 140 may connect to a cloud-based network (e.g. the internet) via a hard-wired connection or wireless connection. It is contemplated that computing device of the initiator device 110 may include a mobile computing device, such as a laptop, tablet, smartphone which includes an integrated wireless transceiver. Once a connection has been established and verified with the cloud-based server device 130, the application of the computing device of the initiator device 110 may upload and synchronize game-related information to a cloud-based database residing on a cloud-based server device 130 (e.g. a web server accessible over a web-browser or application implemented on the computing device of the initiator device 110). Cloud-based server device 130 may implement at least one cloud-based application executable by a processor of the computing device of cloud-based server device 130 to allow access by initiator device 110 or receiver device 140.

It is contemplated that display device 120 may be operably connected to cloud-based server device 130. Display device 120 may retrieve game information, player information and additional content including advertisements from cloud-based server device 130. It is further contemplated that this information may be pre-loaded from the cloud-based server device 130 to display device 120 to allow more efficient execution of display elements, particularly for large-sized video segments. Advantageously, with files being transferred from the cloud-based server device 130 to the display device, delays and interruptions which may occur during video streaming may be avoided. Also, it may be possible to execute software and application updates that may be provided from the cloud-based server device to the initiator device 110, display device 120 and receiver device 140.

In an example embodiment, through the web-browser software, a user can use the computing device of initiator device 110, display device 120 or receiver device 140 to log on to cloud-based services (e.g., by the web-browser software resident on the computing device communicating with cloud-based server device 130) to access a cloud-based database. After logging-on to the cloud-based server device, game-related information sent to display device 120 by initiator device 110 may be simultaneously delivered to cloud-based server device 130. Advantageously, after logging-on to the cloud-based server device 130, game-related information stored at a database of the cloud-based server device 130 may be retrieved by receiver device 140. In such a fashion, a user of receiver device may access the current game information via the receiver device, such as a smartphone, in order to better follow action of a game without necessarily being in view of the scoreboard, or display device 120.

As shown in FIG. 1, system 100 includes a single initiator device 110, a single display device 120 and a single receiver device 140. It is contemplated that this figure is presented for exemplary purposes. However, it is contemplated that system 100 may include a plurality of initiator devices 110 (e.g. separate initiator devices may be employed for time information, score information, and statistical information). System 100 may include a plurality of display devices 120 and may include a plurality of receiver devices 140 (e.g. each fan may utilize a smartphone to retrieve game-related information presented to them on their smartphone).

Referring to FIG. 2, another block diagram of a system 100 for presenting game related information in accordance with embodiment of the present disclosure is shown. Similar to system 100 as depicted in FIG. 1, system 100 as shown in FIG. 2 may include initiator devices 110A-110F, a display device 120, cloud-based server device 130 and receiver device 140. It is contemplated that initiator device 110 of system 100; however may be implemented in a variety of computing devices for presenting game-related information input by one or more users which may be delivered to display device 120 via a hard-wired or wireless connection and simultaneously sent to cloud-based server device 130. As shown, system 100 may include a variety of initiator devices 110A-110F, each including an application to serve a particular function or set of functions, in order to facilitate accurate and reliable data entry associated with a game by one or more users. However, it is contemplated that the applications associated with initiator devices 110A-110F may be integrated into a single, two, three and the like computing devices without departing from the scope and intent of the present disclosure.

Initiator device 110A may be referred as a scorekeeper. Initiator device 110A may include a graphical user interface configured for time and score information related to a game. It is contemplated that the scorekeeper may be implemented as an application for use within a computing device, such as a laptop, tablet or smartphone. It is contemplated that the scorekeeper may be employed to manage game-related information such as time, score, fouls, and point/foul-to-player attribution during a game. It is contemplated that the graphical user interface of scorekeeper may be customized to serve a particular type of game, such as basketball, volleyball, wrestling, football, swimming, soccer, baseball, hockey and the like. By adjusting the interface to the type of game, data input by a user viewing the particular type of game may be improved.

Figure 3A:
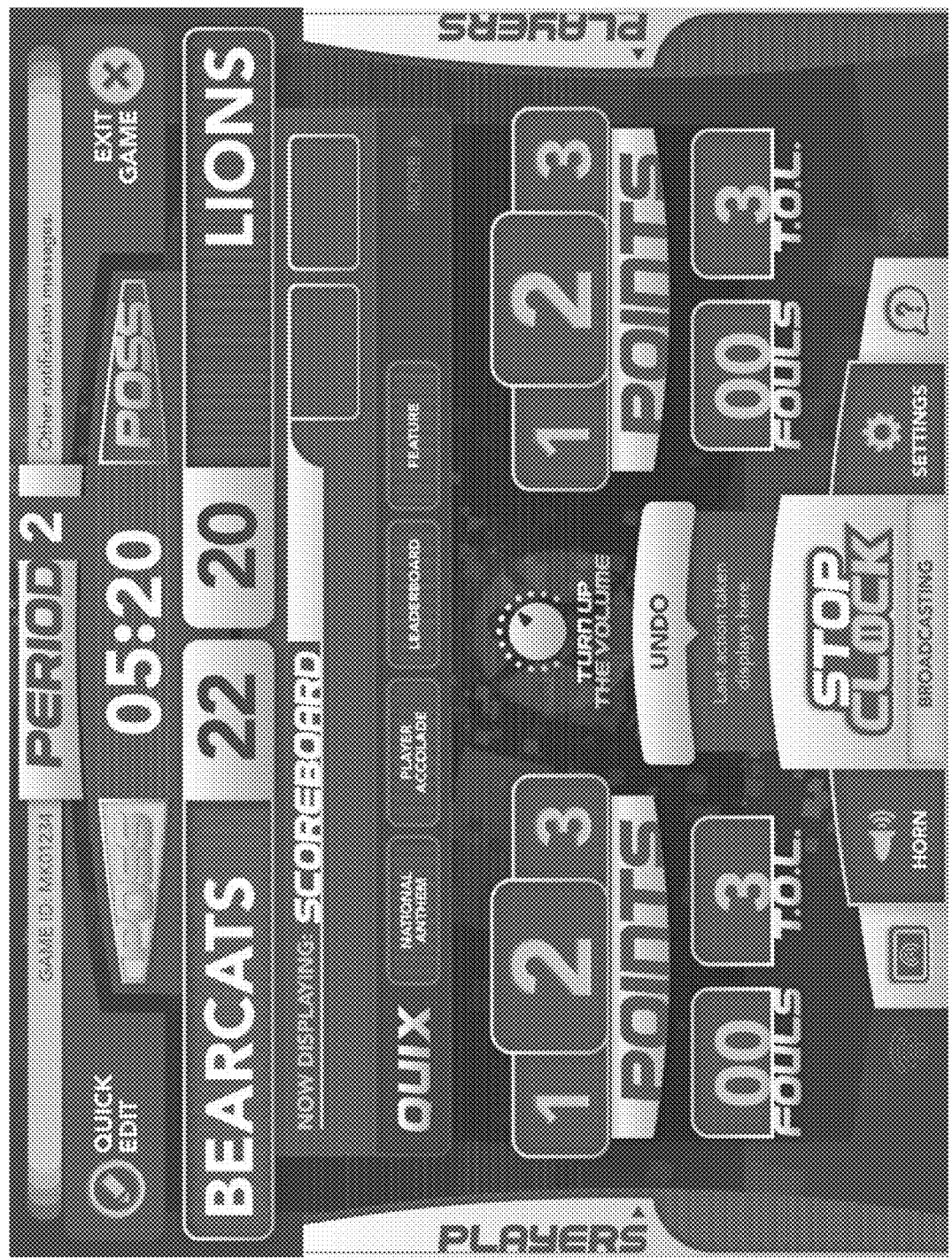
FIG. 3A-3C depict exemplary graphical user interfaces of the scorekeeper in accordance with an embodiment of the present disclosure.
Figure 3B:
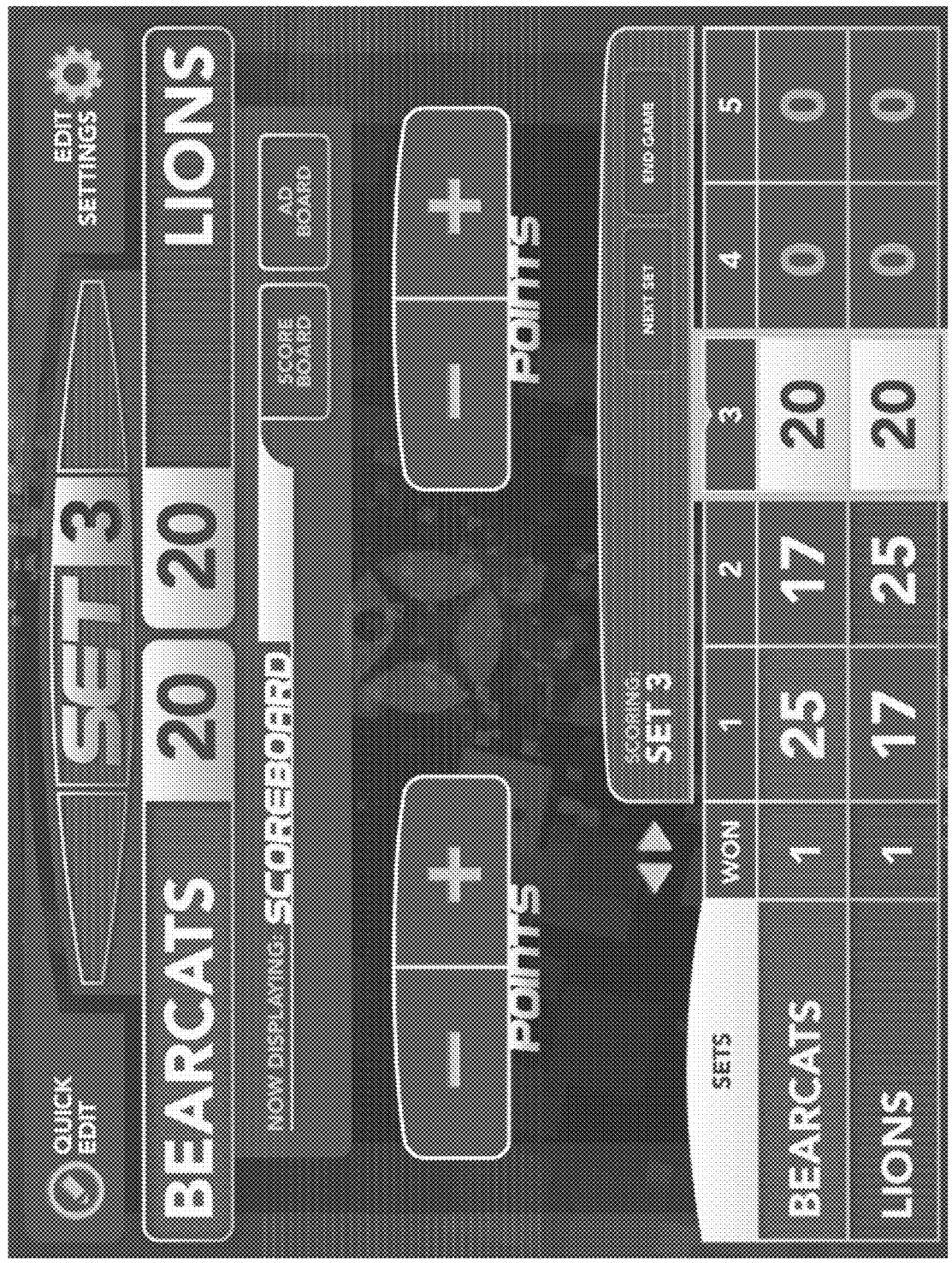
Figure 3C:
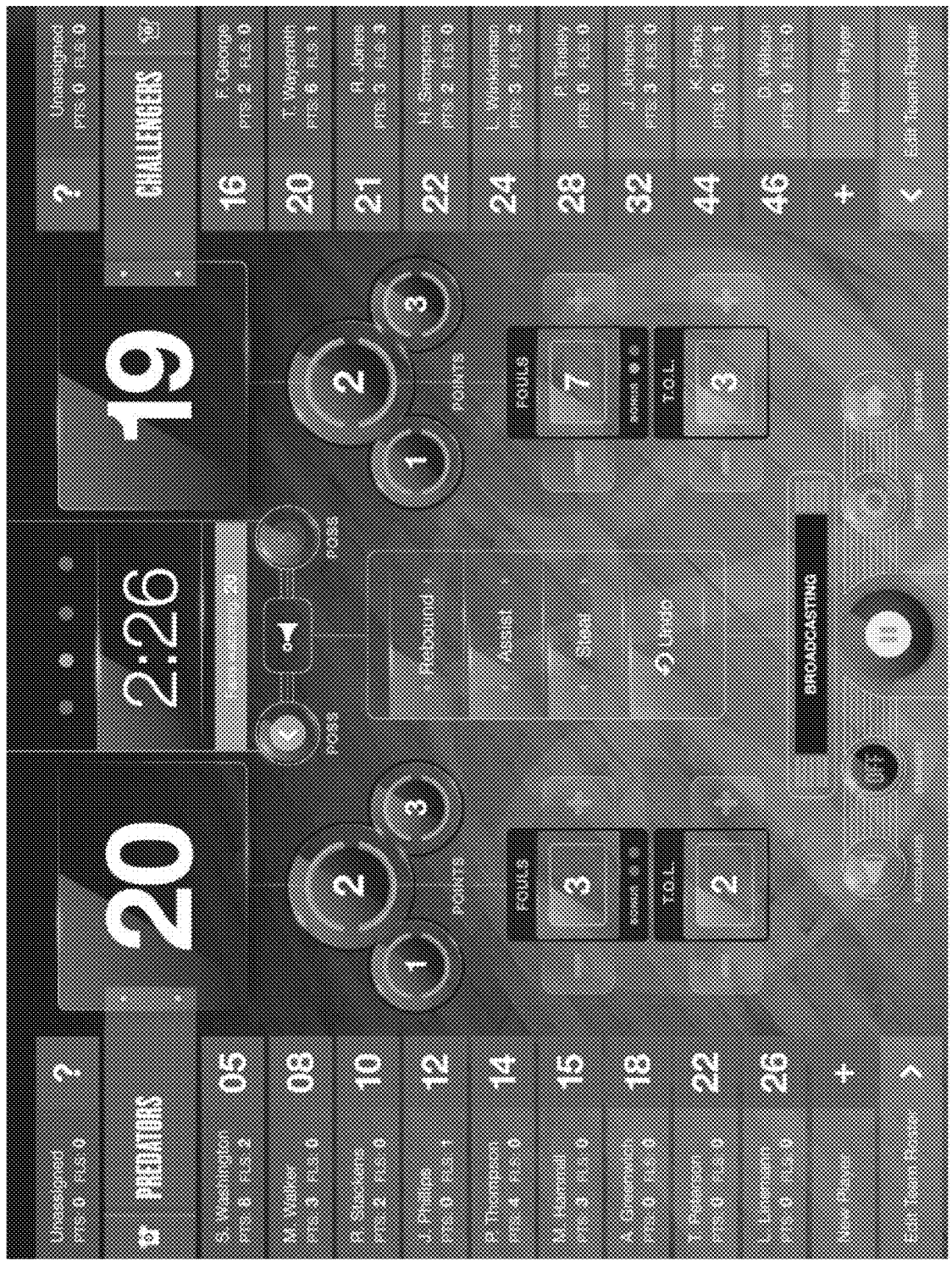
Figure 4A:
FIG. 4A-4B depict QUIX elements which may be quickly introduced via a button as shown in FIG. 3A and may include images, videos, motion graphics and interactive content that may overlay or interrupt elements on the display of display device in accordance with an embodiment of the present disclosure.
Figure 4B:
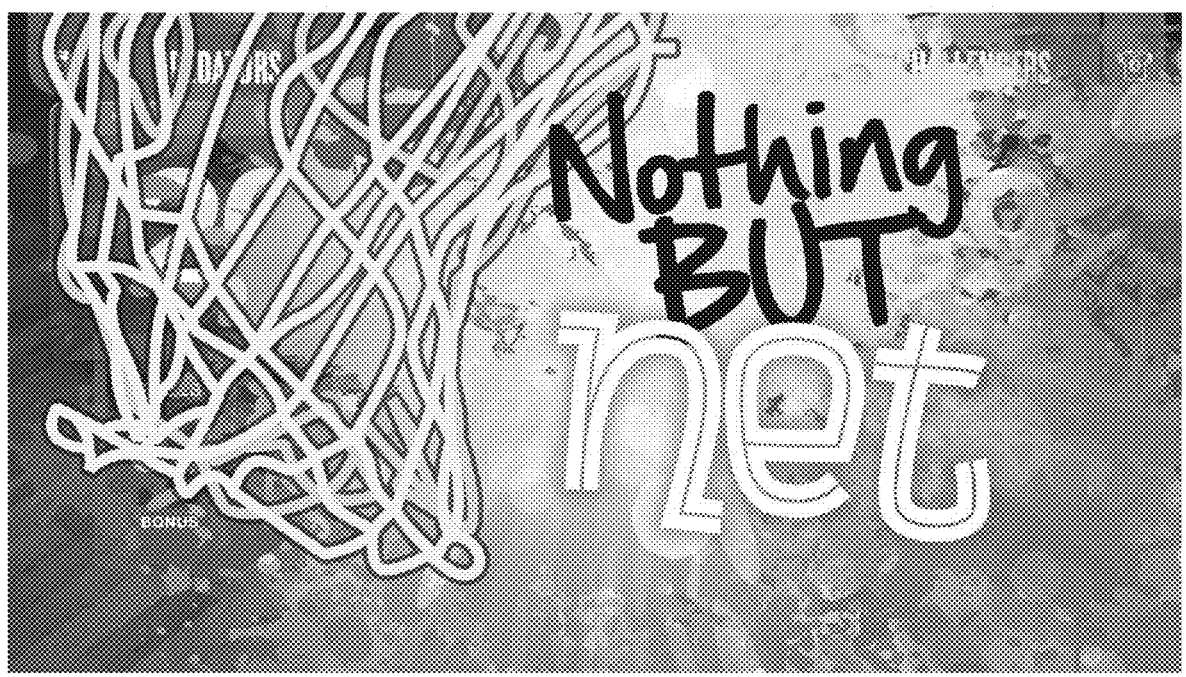
Figure 5:
FIG. 5 depicts an exemplary screenshot which may be automatically presented to a user of the scorekeeper to allow transitioning to halftime in accordance with an embodiment of the present disclosure.
Figure 6A:
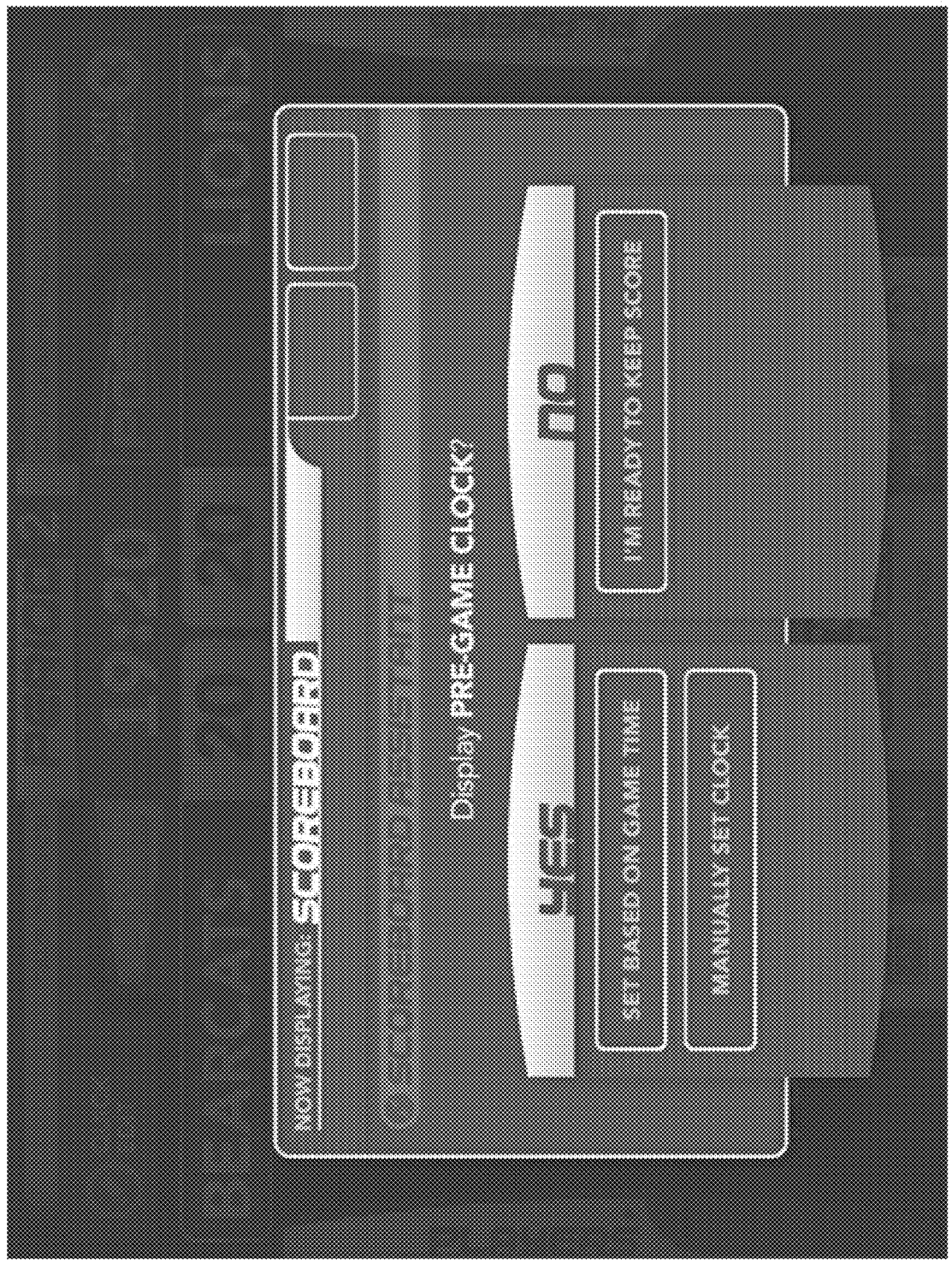
FIG. 6A-6B depict exemplary screenshots of the Scoreboard Assistant in accordance with an embodiment of the present disclosure.
Figure 6B:
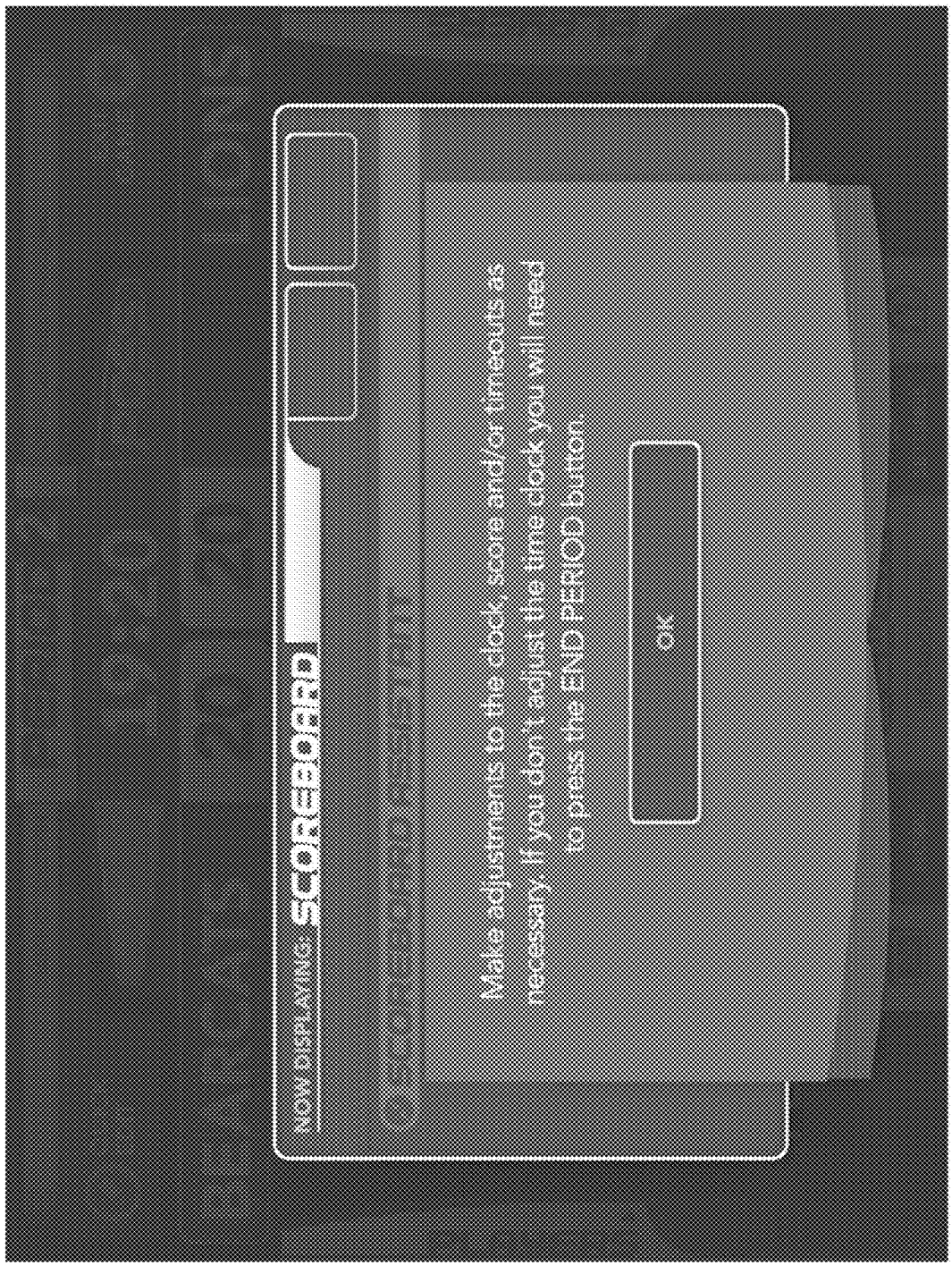

Referring to FIG. 3A-3C, exemplary graphical user interfaces of the scorekeeper in accordance with embodiments of the present disclosure are shown. It is contemplated that the graphical user interface of the scorekeeper may include limited controls for displaying particular elements, pre-loaded pieces of content that may be activated for display via a button on the graphical user interface, referred as "QUIX" elements as shown in FIG. 3A. These QUIX elements may include images, videos, motion graphics and interactive content that may overlay or interrupt elements on the display of display device 120 as shown in an exemplary embodiment in FIG. 4A-4B. Additionally, the scorekeeper may include smart logic that may provide cues, alerts and/or alarms for the user to assist them through standard processes and transitions, referred as the Scoreboard Assistant. For example, when the clock runs down to halftime of a game, the scorekeeper application of initiator device 110A may recognize the end of the half and may automatically present a user with appropriate options to allow transitioning to halftime, such as the screenshot as shown in exemplary fashion in FIG. 5. Referring to FIG. 6A-6B, examples of the Scoreboard Assistant are shown in accordance with an embodiment of the present disclosure. Additionally, it is contemplated that not every game follows the exact same rules (e.g. there are various overtime rules); therefore the scorekeeper application may retrieve various settings from the cloud-based server device 130 for default settings. However, a user may be allowed to override those default settings at any individual game whereby the smart logic of the scorekeeper application may react appropriately for each game instance.

Figure 7A:
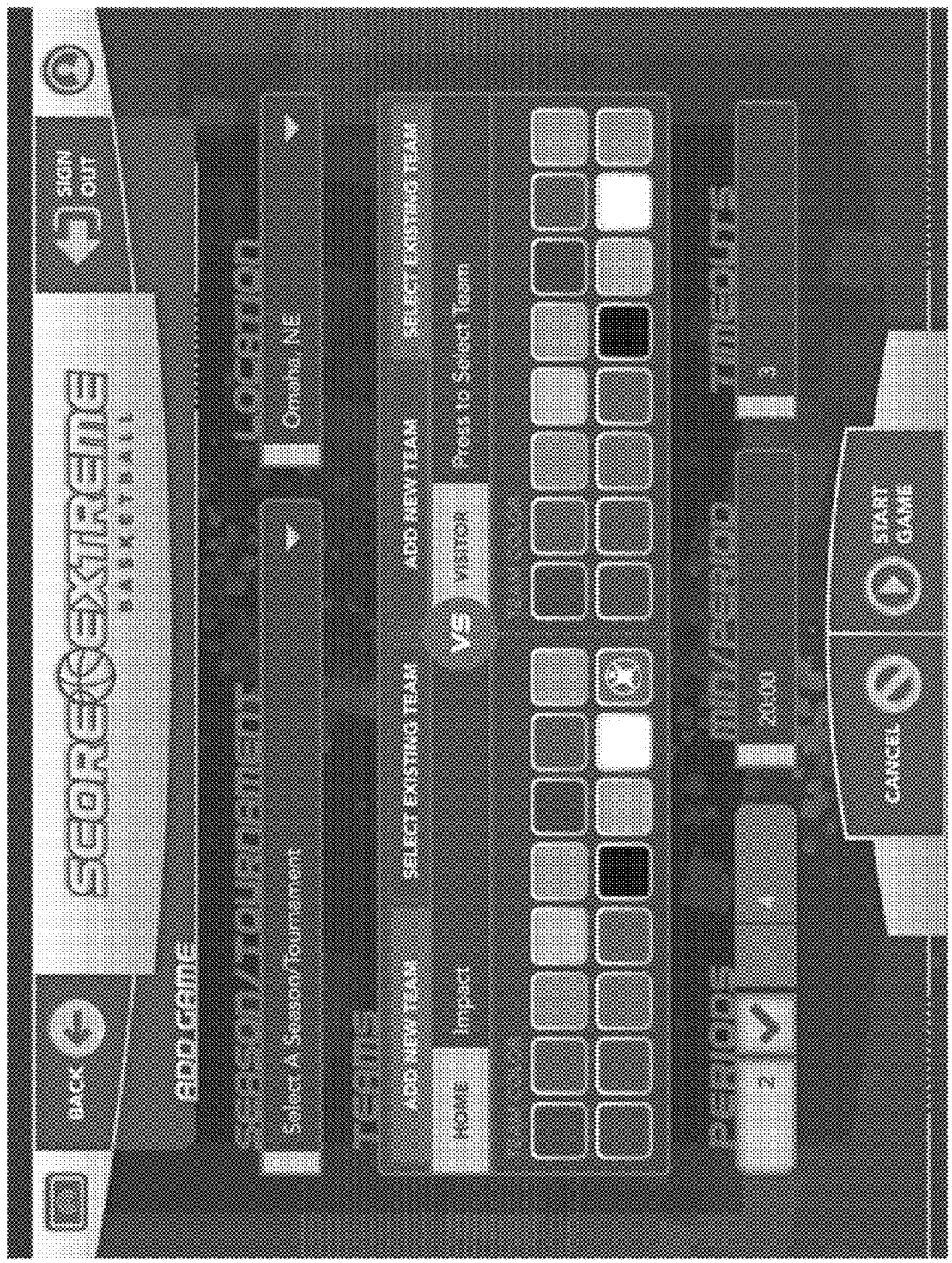
FIG. 7A-7B depict exemplary graphical user interfaces of the scorekeeper for generating a desired layout of the screen of the display device in accordance with an embodiment of the present disclosure.
Figure 7B:
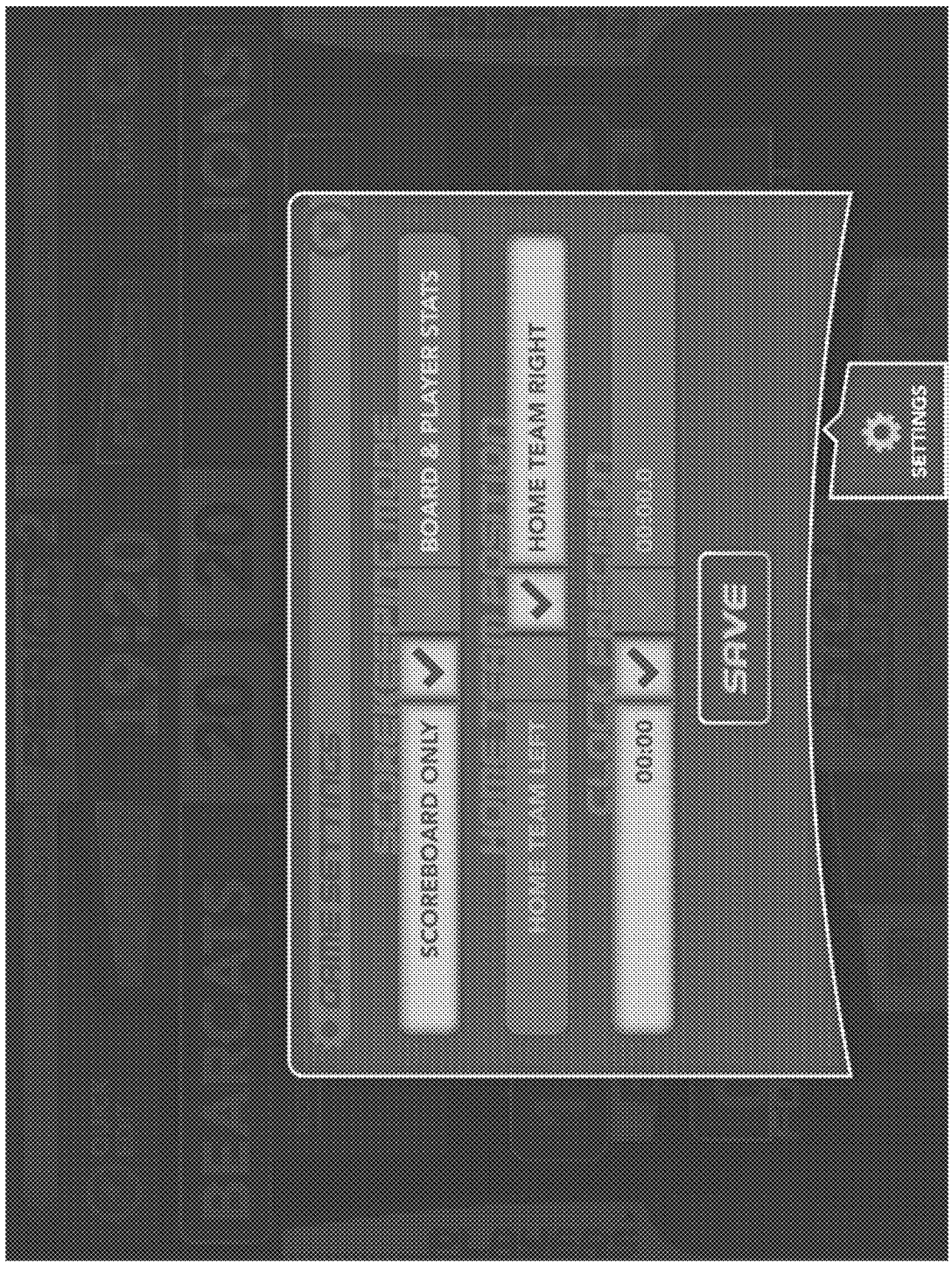

Referring to FIG. 7A-7B, exemplary graphical user interfaces of the scorekeeper for generating a desired layout of the screen of the display device 120 in accordance with an embodiment of the present disclosure are shown. Advantageously, the scorekeeper may include graphical user interfaces to change the color, form and layout of the display device 120 in a quick and easy manner. This may be particularly advantageous when more than one team may utilize a particular facility. By employing the pre-installed versions of the graphical user interfaces as shown in FIG. 7A-7B, a display device 120 may be quickly adapted to display game-related information for different teams. It is further contemplated that any additional content that may be employed may also be easily customized to ensure that different graphics, videos and advertisements may be employed.

Initiator device 110B may be referred as a statkeeper. Initiator device 110B may include a graphical user interface configured for entry of individual player statistics. It is contemplated that the statkeeper may be implemented as an application for use within a computing device, such as a laptop, tablet or smartphone. It is contemplated that the statkeeper may be employed to manage game-related information such as advanced games statistics (e.g. for basketball, the statkeeper may be utilized in place of the long-standing paper stat sheet and may manage the same bits of information including player number, 3 point field goal attempts, 3 point field goal makes, 2 point field goal attempts, 2 point field goal makes, field goal percentage, free throw attempts, free throw makes, free throw percentage, assists, turnovers, offensive rebounds, defensive rebounds, steals, deflections, blocked shots, no help, got beat, fouls, fastbreak points, and totals per quarter and period, and the like). Similar to initiator Device 110A referred as scorekeeper, initiator device 110B referred as statkeeper may simultaneously push data to cloud-based server device 130 for storage of player statistics. Also, it is contemplated that the graphical user interface of statkeeper may be customized to serve a particular game, such as basketball, volleyball, wrestling, football, swimming, soccer, baseball, hockey and the like for easier data input by a user.

Referring once again to FIG. 2, initiator Device 110C may be referred as a producer. Initiator device 110C may include a graphical user interface configured for retrieval and selection of additional content for display on display device 120. It is contemplated that the producer may be implemented as an application for use within a computing device, such as a laptop, tablet or smartphone. It is contemplated that the producer may be configured to control and manage additional content for display on display device 120 and may monitor and manage a status (including power on/off) of the connections and components.

Figure 8:
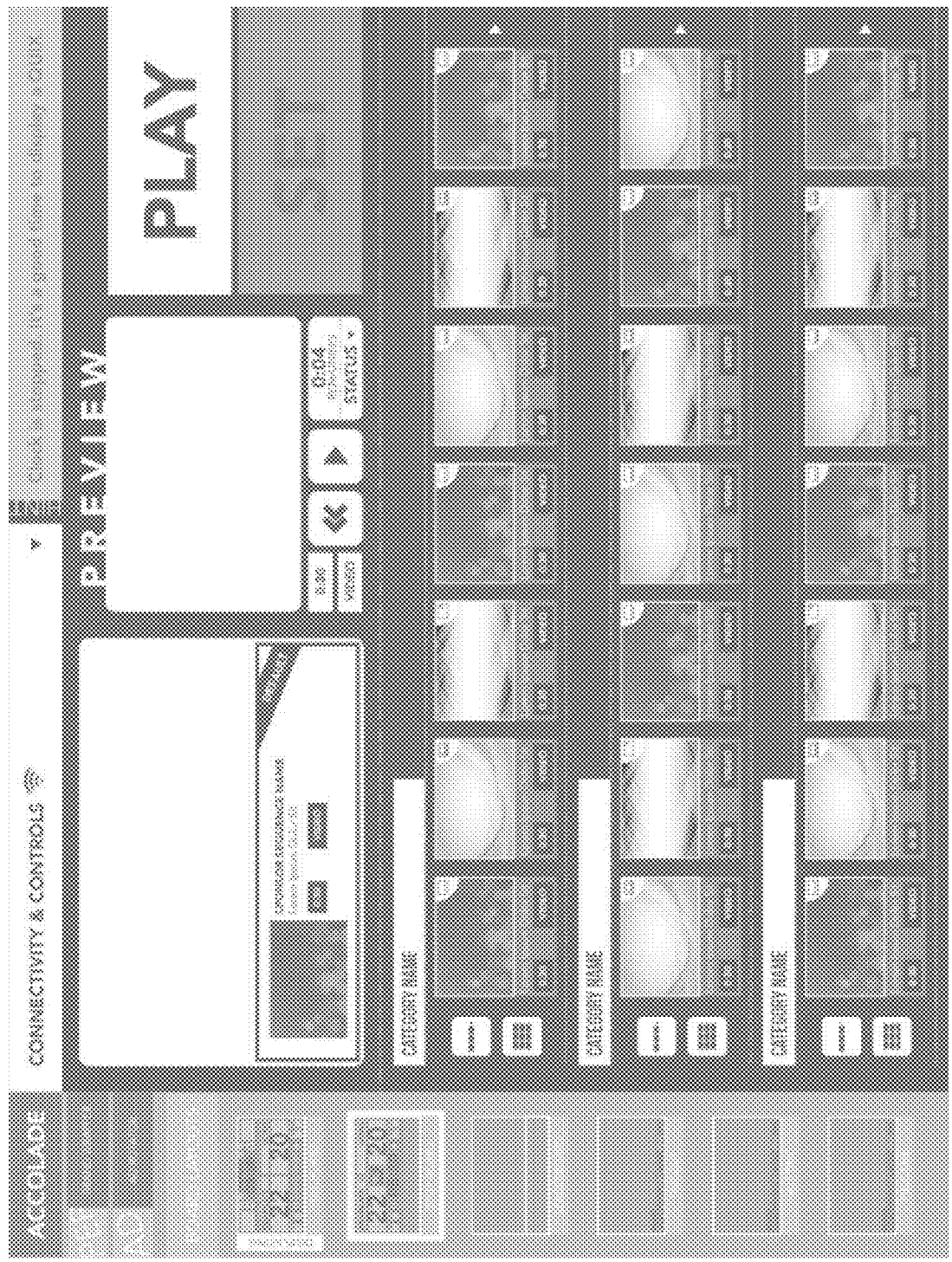
FIG. 8 depicts a graphical user interface which includes various content offerings, stored on the cloud-based server device, for access and selection via the producer in accordance with an embodiment of the present disclosure.

Producer may be operably connected with the cloud-based server device 130 for retrieval of content. Referring to FIG. 8, a screenshot of a graphical user interface which includes various content offerings, stored on the cloud-based server device 130, for access and selection via the producer is shown. The additional content may include the pre-defined "QUIX" elements like a National Anthem, Player Accolades, a variety of Hype Animations (e.g. "Make Some Noise" and "3 Pointer" banners as shown in an exemplary embodiment in FIG. 4A-4B and may be activated by an interface. (e.g. a single button) on scorekeeper as shown in FIG. 3A. The additional content may include "Ad Sequences" which may be displayed at the display device 120 and may be employed to generate additional revenue for schools and youth organizations. It is further contemplated that the additional content available for usage during a game may be retrieved from the cloud-based server device 130. In addition to content, authorized layouts may be available for manipulation on the cloud-based server device 130. Producer may also be able to access photos and comments provided by others via social media and can be retrieved and deployed to the display device 120 and auxiliary display 210.

Figure 9:
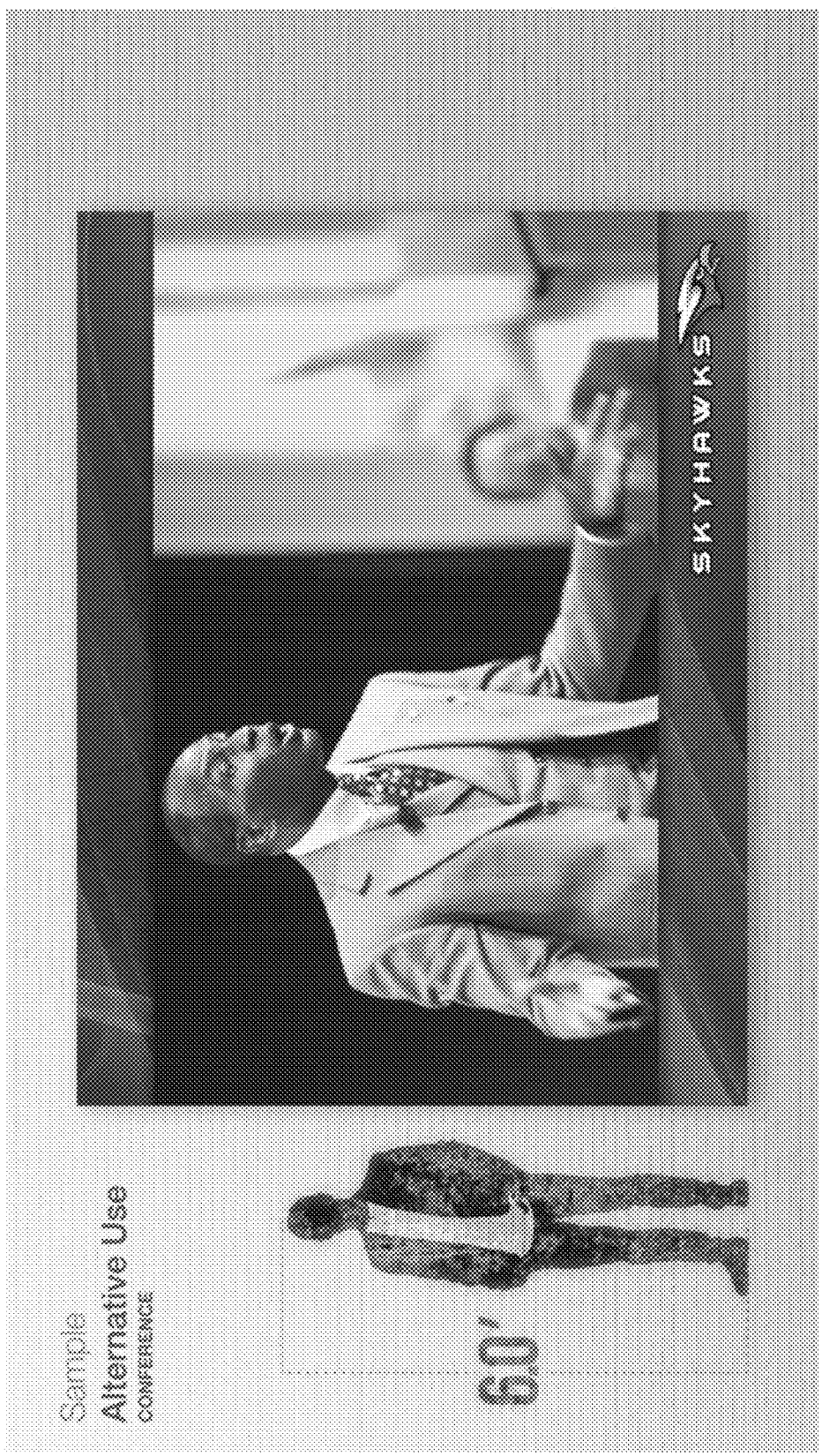
FIG. 9 depicts a screenshot with advertisement of display device suitable to present photos and video of an event in accordance with an embodiment of the present disclosure.

Producer may be configured to present the additional content for all available views (e.g. countdown screens, various scoreboard layouts, and ad rotators) and may be configured to push layouts and content to a live display with a simple push of a "play" button on the graphical user interface. Additionally, producer may include a universal remote feature which is configured to allow communication with each of the hardware components via APIs in order to enable a user to monitor and manage the status of the system components. It is contemplated that producer may include input controls that enable the user to change input source on the display device 120 which allows for connection of other devices to the display device 120 for alternative uses (e.g. presentations, live videos and the like, such as for a graduation ceremony as shown in FIG. 9.) It is contemplated that the connection and content will flow through the producer that sponsor, brand and/or ad elements can be laid over top the content being displayed.

Referring once again to FIG. 2, initiator device 110D may be referred as practice, initiator device 110E may be referred as time clock controller, and initiator device 110F may be referred as the shot clock controller. Initiator device 110D, initiator device 110E and in initiator device 110F may include a graphical user interface configured for data input for practice information, time clock information and shot clock information respectively. It is contemplated that the practice, time clock controller and shot clock controller may be implemented as one or more applications for use within a computing device, such as a laptop, tablet or smartphone. It is contemplated that the initiator device 110D referred as practice may be configured to augment practice drills and physical education activities by providing an optimized interface and experience that supports scoring and time-tracking needs of these drills and activities. Initiator device 110E referred as time clock controller may be configured to control the time clock, such as through a tactile, switch-style hardware device. Initiator device 110F referred as shot clock controller may be configured as a switch-style, hardware device which may be operably connected to the display device 120 and/or the shot clock 220 and may include a switch to start and stop the shot clock 220. It is contemplated that the shot clock 220 may be operably connected with the display device 120 or may be connected to the secure network and receive separate input from shot clock controller 110F.

System 100 may include a camera device 225, or plurality of camera devices. Camera device 225 may refer to a digital camera configured for still or motion video. Camera device 225 may be operably connected to the network and/or may be installed and wired to a dedicated video server which may be networked to a display application of the display device 120. Camera device 225 may be configured to take pictures or photos of the display device 120 when ads or advertisements appear. Each photo taken by the camera device 225 may be triggered by a changing ad or advertisement. It is contemplated that a list of instructions, such as an application, executed by the camera device 225, may tag a photo and transfers it to the cloud-based server device 130. This may allow tracking of ads and advertisements in order to generate performance reports for validation that the ad or advertisement was actually displayed as promised. It is contemplated that camera device 225 may also obtain photos and/or video footage of the action on the court or field. For example, it is contemplated that camera device 225 may be directed to individuals in the stands. From photos taken of individuals in the stands, it is contemplated that a number of individuals present in the stands, and thus available to view the advertisements of the display device 120, may be stored and presented to advertisers. Additionally, it is contemplated that camera device 225 may employ computer vision to track an aspect of the game, such as a ball, and follow the action in order to deliver automated, streaming content of the game which could be sent to the cloud-based server device and viewed by a user on receiver device 140, in near real-time.

System 100 may include an aid device 205. Aid device 205 may include a computing device (e.g. a computer, laptop, tablet, smartphone and the like) which includes an application (e.g. an app) executed by a processor of the computing device to receive game-related information from initiator device 110A-110F. It is contemplated that aid device 205 may be a wearable device, such as APPLE IWATCH. It is further contemplated that aid device 205 may provide an alert or alarm for a referee, game coordinator, or coach. For example, aid device 205 may be configured to provide an alert or alarm to a referee, game coordinator or coach regarding foul-outs, timeouts, end of section, game start time and the like. Game-related information provided to aid device 205 may further include countdown clocks for game start and half-time resumption of game as well as an updated list of players and foul counts.

System 100 may include a receiver device 140. Receiver device 140 may include a computing device, such as a laptop, tablet, or smartphone. Once a connection has been established and verified with the cloud-based server device 130, an application of the computing device of the receiver device 140 may retrieve game-related information from initiator devices 110A-110F via a cloud-based database residing on a cloud-based server device 130. Cloud-based server device 130 may implement at least one cloud-based application executable by a processor of the cloud-based server device 130 to allow access by a computing device of receiver device 140.

Figure 10:
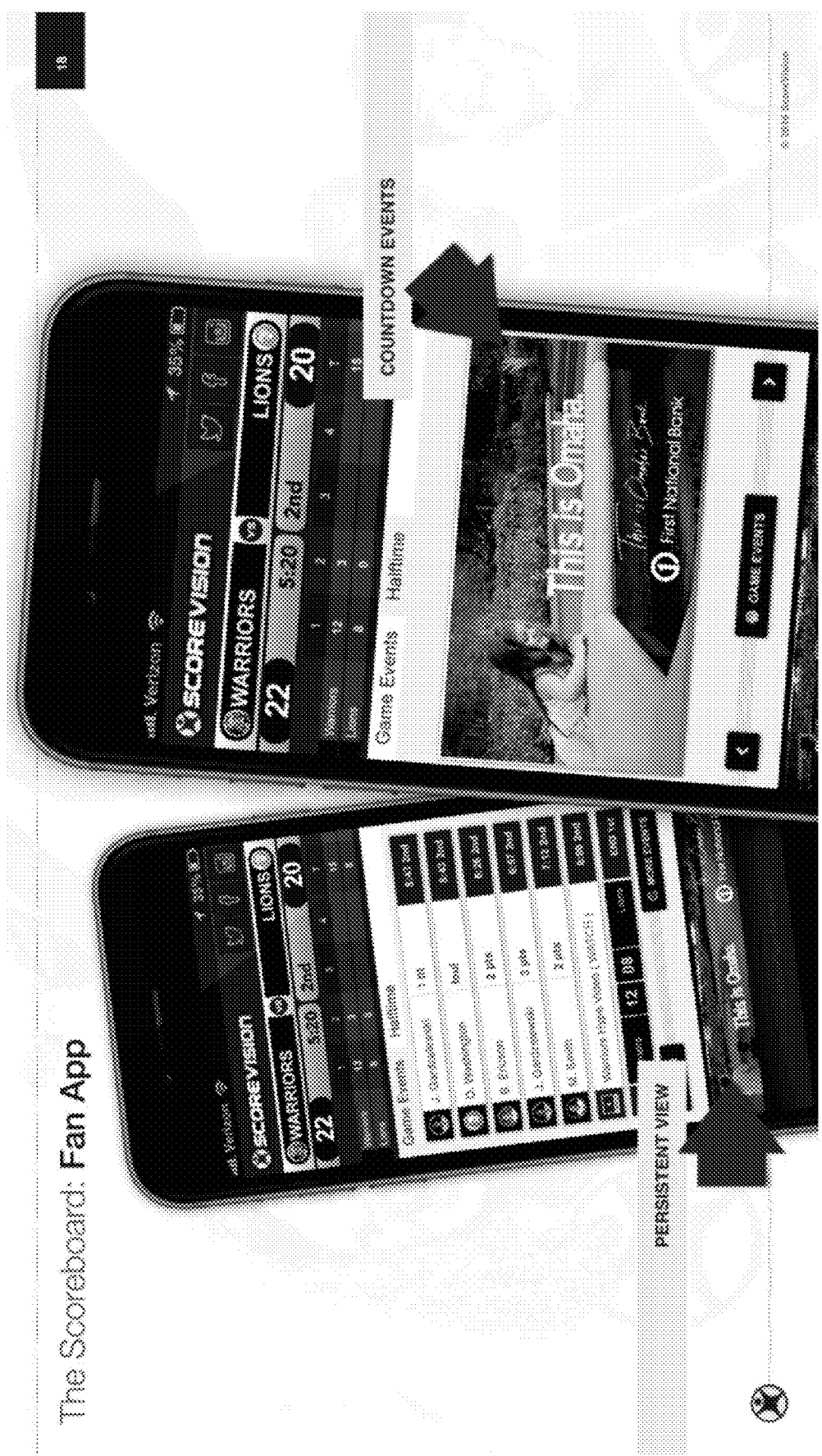
FIG. 10 depicts a graphical user interface on a display of a receiver device in accordance with an embodiment of the present disclosure.
Figure 11A:
FIG. 11A-11D depict layouts and view options that may be available for display device in accordance with an embodiment of the present disclosure.
Figure 11B:
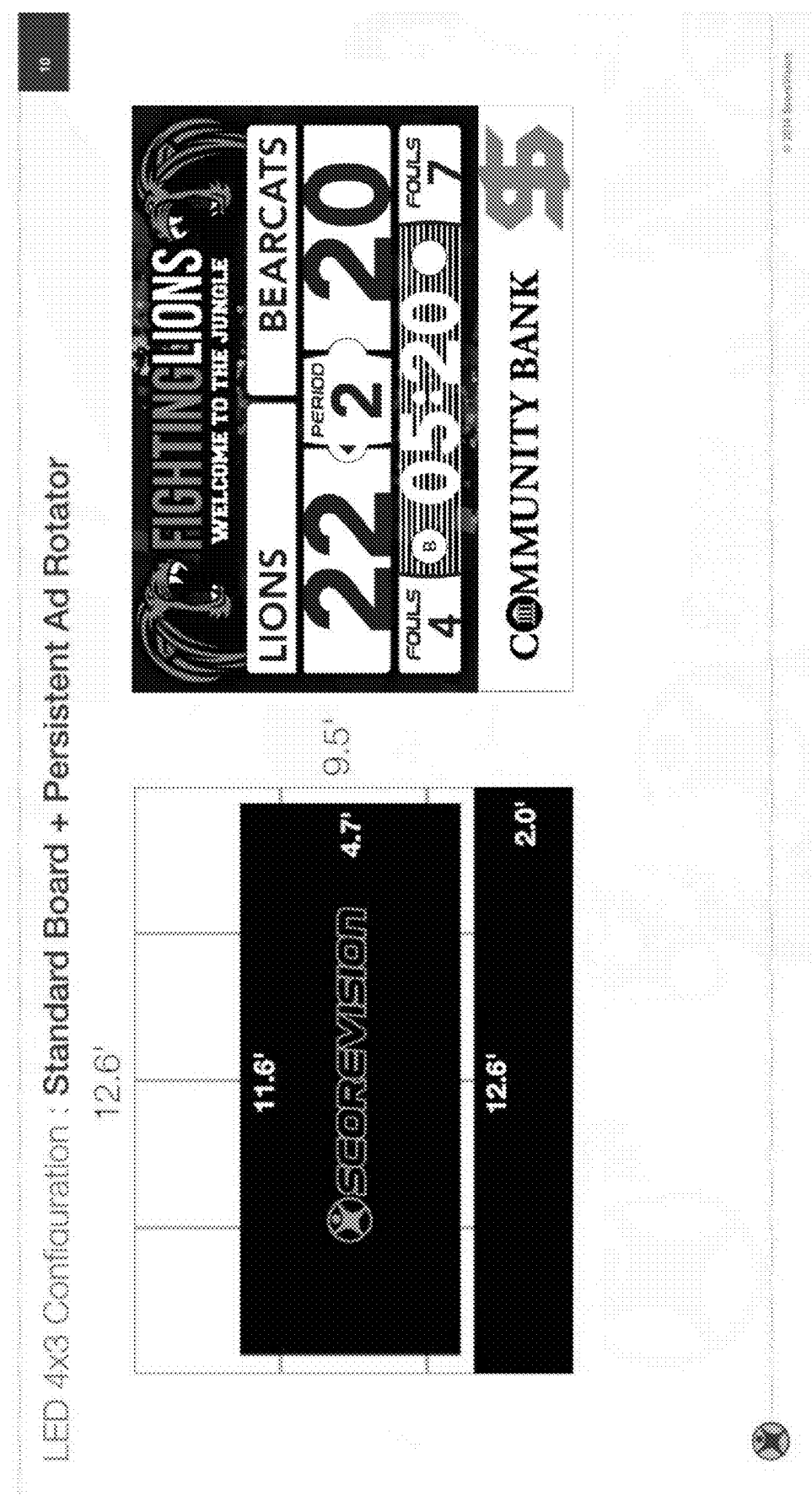
Figure 11C:
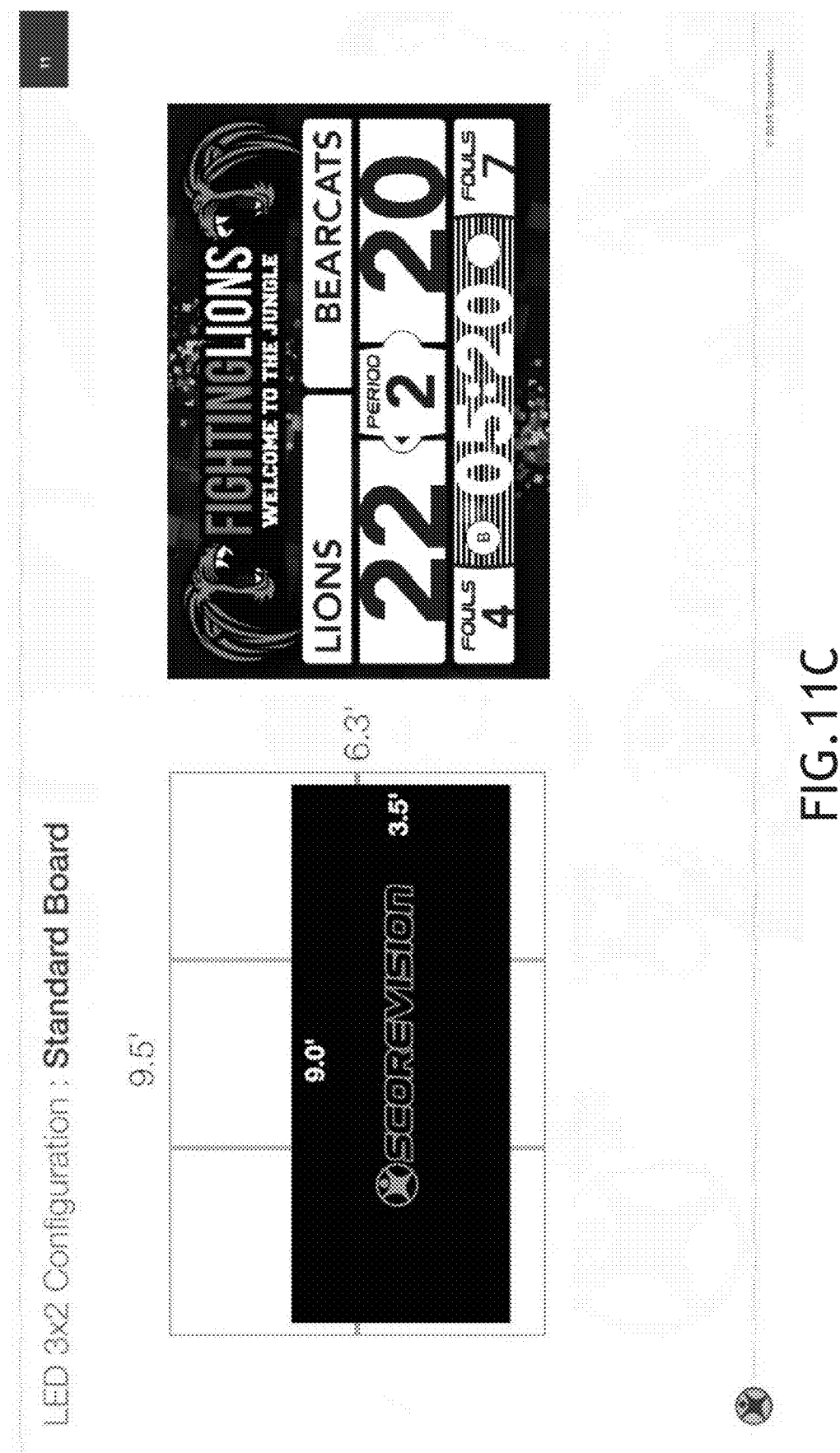
Figure 11D:
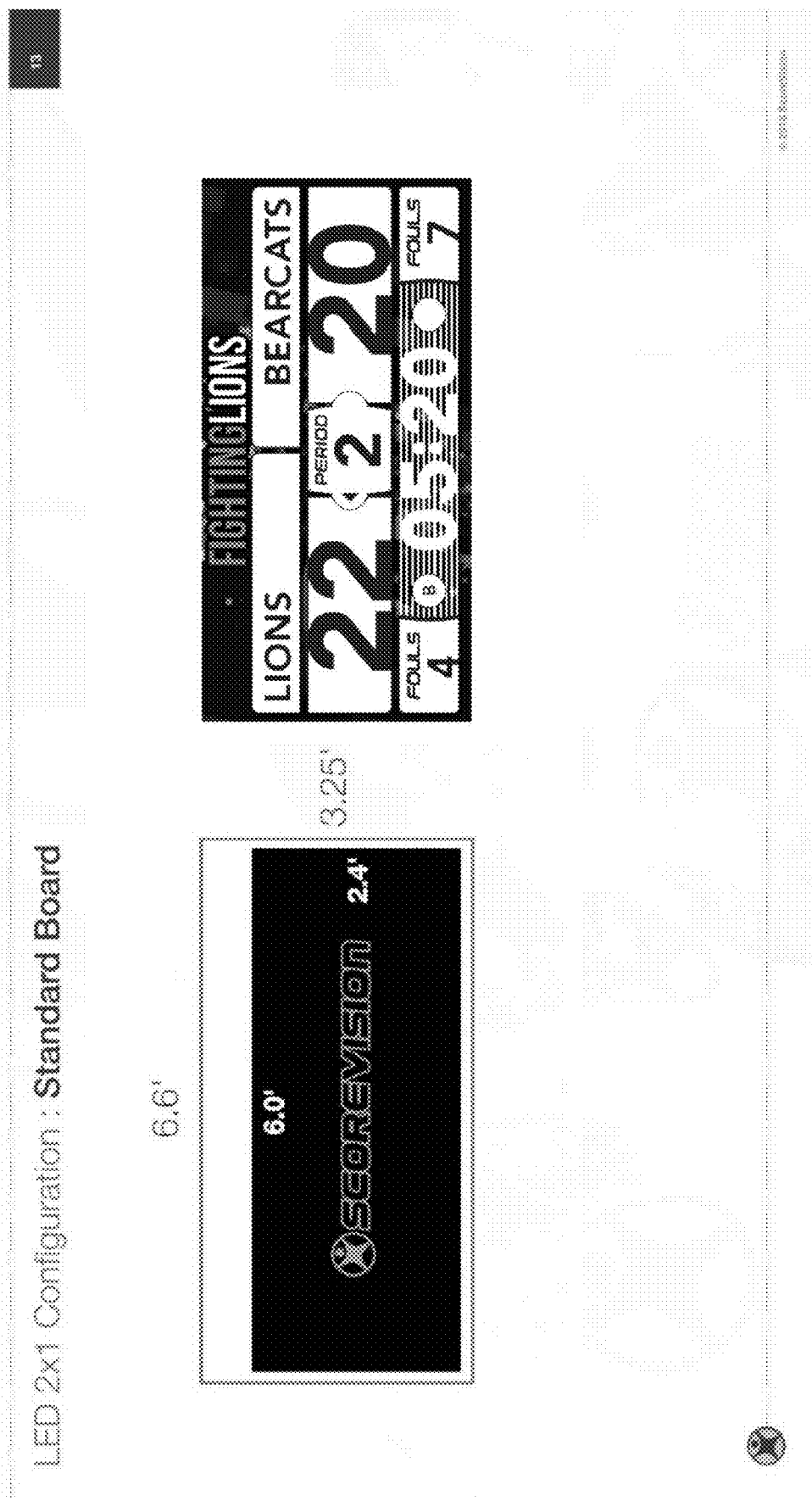

Receiver device 140 may be referred as a fan device which may be implemented to receive game-related information to be viewed via a graphical user interface on a display of a receiver device 140 as shown in an exemplary fashion in FIG. 10. The game-related information may include photos and video from camera device 225 and may include scores, fouls, game breaks, ad sequences in persistent and interstitial deliveries, advanced player stats, team schedules as it is available and provided via the initiator devices 110A-110F and cloud-based server device 130.

Additionally, receiver device 140 may include one or more instructions in an application in which input information may be received from a user and transmitted to the cloud-based server device 130. This input information may include a request for a type of subset of the game-related information, such as a particular feed from a camera device 225 or particular statistics from a particular player. For example, this type or subset of the game-related information may include a request for advanced stats for teams, particular players, particular number, as well as team schedules. It is contemplated that cloud-based server device 130 may be configured to filter the game-related information in order to present the type or subset of information included in the request from the user via the receiver device 140. Additionally, this input information may include answers to trivia challenges and contributory games. It is contemplated that display device 120 may include a spirit meter in which fans for two teams may compete in a spirit tug-of-war. It presents an animated slider graphic on the display device 120 and may utilize social media integration and special logic to weigh crowd participation on social media, (e.g. measuring presence of pre-identified tweets on TWITTER shared by each team during a specific timeframe). It is further contemplated that users, via the receiver device 140, will be able to take photos or videos provided by an integrated camera of a mobile computing device and then tag and share them with others using the application of the receiver device. These shared images or videos may be stored at the cloud-based server device 130 with tagging and associated to an appropriate team, game and player.

System 100 may further include facilities and management support device 230 and an admin device 240. Facilities and management support device 230 and admin device 240 may include a computing device (e.g. a computer, laptop, tablet, smartphone and the like) which includes one or more instructions (e.g. an application) executed by a processor of the computing device. Facilities and management support device 230 and admin device 240 may connect to a cloud-based network (e.g. the internet) via a hard-wired connection or wireless connection. Once a connection has been established and verified with the cloud-based server device 130, facilities and management support device 230 and admin device 240 may allow configuration of cloud-based server device 130. Facilities and management support device 230 may provide an oversight tool for a facilities manager to monitor activity on multiple courts in a building at the same time. It is contemplated that a preview of content displaying on each device in a facility may be presented via the facilities and management support device 230 with status indicators. Facilities and management support device 230 may include help notifications which may be triggered and supplied to the facilities and management support device 230 by each active scorekeeper connected to hard-wired or wireless network. Also, facilities and management support device 230 may be configured to monitor basic hardware controls (power on/off/reset) in order to provide remote resets.

Admin device 240 may include a variety of applications to facilitate management of system 100, the retrieval and delivery of statistical information, additional content, and advertisements. Management may include the game information before and after the game. For example, through the admin device 240, a user may create and manage season, team, game and player data, including team schedules so that it may be available for download to the initiator devices 110A-110F at game time or receiver device 140. Also, admin device 240 may include an import feature which enables a user to upload a spreadsheet of data from third party tournament systems like Tourney Machine for quicker set up of large game events and to eliminate unnecessary keystroking to enter data. After a game is completed, admin device 240 may review and reconcile game event data. Admin device 240 may allow a user to define layouts and view options that may be available to the initiator device 110C, the producer. These exemplary layouts and view options are shown in FIG. 11A-11D.

Admin device 240 may include a profile and statistical reporting application. Authorized users, such as (administrators, coaches, players, parents, recruiters, and the like) may review and download reports on season, team, game and player data recorded via the initiator devices 110A-110F, for example scorekeeper and statkeeper. It is contemplated that this profile and statistical reporting application may aggregate information in the system that is input through the admin device 240, recorded via the initiator devices 110A-110F and contributed through the receiver device 140 (e.g. tagged photos and videos). The aggregated player information may be compiled as reports in a manner that family members could download them as "memory books" or share with recruiters as a sports portfolio.

Admin device 240 may include a creative center application. The creative center application may include a toolset to enable administrators and content contributors to upload and manage collections of content, for later display on display device 120 during games and events. Users may leverage the tools in this toolset to organize and collect content and assign it to specific games via initiator device 110C known as the producer so that the selected content may be ready for display during game time. Users may use these tools to define "default" content for each of the layouts and areas that may be available for view. The content may be stored in a private, organization-level "library" with options to share pieces of content with other users. Additionally, shared content may not have a cost to the contributor who wants to share it but there may be an option for the contributor to offer the content for free or at a cost—users can add "shared" content to their own library but may be charged the cost of the content if fees are assigned to the contributor (the fee may be provided to a contributing organization).

Admin device 240 may include a sponsor and ad management application. Sponsor and ad management may enable a user to create libraries of advertisements and ads that may be deployed to the display device 120 or auxiliary display 210, along with receiver device 140. Sponsor and ad management application may include different levels of management controls available, which may include a super admin level control that may have reign over all organizations, subsets of data and permission/relationship controls, a partner level control that may have reign over data for a specific organization (or organizations) to which they are assigned and an organization level control that may enable a user to manage only data within their associated organization.

Sponsor and ad management application may include a toolset to enable authorized users to upload and organize ad content (images or videos) by sponsor. The user may assign a particular ad to a particular location on the display, time, and the like or may include sequences to specific rotation areas on the display device 120 or auxiliary display 210. It is contemplated that sequences may be defined at the organization level which will automatically trickle down to all seasons and games as they are created. The toolset of the sponsor and ad management application may enable a user to override the trickle down assignment with other sequences at the season and then even down to the game level. It is contemplated that sponsor and ad management application may include a tool which may enable a forced push of ads to the display device 120 with a visual preview of the ad sequence rotation. Also, a reporting feature, as employed with the camera device 225, may be part of the sponsor and ad management application. The reporting feature may provide readouts of ad sequences and impressions tracked for each ad that has been displayed by a display device 120 or auxiliary display 210.

As shown in FIG. 2, it is contemplated that there may be a display device 120 and auxiliary display 210. Additionally, it is contemplated that there may be a variety of display devices and each display device may present similar game-related information and similar additional content. However, it is contemplated that display devices, via a plurality of display devices 120 or auxiliary displays 210 may provide different game-related information. For example, display device 120 may provide team, score and time information and auxiliary display 210 may provide individual player statistic information. Also, the additional content, selected via producer, may be adjusted so that display device 120 includes different content and advertisements than what is shown on auxiliary display 210. It is contemplated, that in such an embodiment with different advertisements being placed on display device 120 and auxiliary display; that a first camera device 225 may be oriented towards display device 120 and a second camera device 225 may be oriented towards auxiliary display 210 to verify actual display of advertisements on both displays.

It is contemplated that system 100 as described in FIG. 2 may include one or more devices that may not be desired by a particular user. For example, initiator device 110D referred as practice may not be desired. However, operation of the system may be viable without inclusion of any of the components, rather, the components of system 100 of FIG. 2 may be selected to fit a particular user's requirements. Also, it is contemplated that one or more devices may be combined. For example, it is contemplated that shot clock controller and time clock controller could be combined into a single device in which a single user may be able to manage operation of the shot clock and the time clock via a single application working on a single initiator device without departing from the scope and intent of the present disclosure.

It is contemplated that entry of game-related information by initiator devices 110A-110F and photos and video may be captured by camera device(s) 225 may include a time stamp with each receipt of each piece of game-related information. Each piece of game-related information may include each update and may include the capture of images and video from camera devices(s) 225. The game-related information, with the time-stamp information associated with the game-related information, may be stored at the cloud-based server device 130. Advantageously, if there is a moment associated with a particular game, such as a made 3 point shot, additional information regarding the moment of time may be retrieved. It is contemplated that the game-related information associated with that made 3 point shot may include time-stamp information. With that time-stamp information, it may be possible to retrieve other game-related information associated at that particular point in time, including photos, videos, advertisements and additional content that were obtained or presented at the same point in time as the made 3 point shot. As a result, it may be possible to later retrieve all aspects of game-related information taken at a particular point in time from cloud-based server device 130.

It is contemplated that system 100 may be operable to work with social media sites such as TWITTER, FACEBOOK, and INSTAGRAM. For example, receiver device 140 including the fan application may be employed to retrieve game-related information from cloud-based server device 130. Receiver device 140, through fan application, may request a subset of game-related information. This subset of game related information may include advanced statistical information regarding a particular player, such as a relative. It is contemplated that this advanced statistical information may be shared with others by a user via integration with a user's social media, including TWITTER, FACEBOOK, and INSTAGRAM.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed is:

1. A system for presenting game-related information, comprising:

an initiator device, the initiator device including a computing device, the computing device of the initiator device including a processor configured to execute one or more instructions configuring the computing device of the initiator device to present an input graphical user interface for receipt of game-related information by a user, each piece of game-related information including time-stamp information;

a scoreboard display device for a gym or arena, the scoreboard display device operably connected to said initiator device, the scoreboard display device configured to present the game-related information from the initiator device;

a cloud-based server device operably connected to the initiator device, the cloud-based server device including a computing device, the computing device of said cloud-based server device including a processor configured to execute one or more instructions configured for receipt and storage of each piece of the game-related information with the time-stamp information, wherein other game-related information associated with particular time-stamp information is configured to be retrieved from the cloud-based storage device and the input graphical user interface of the initiator device includes one or more buttons, wherein each button of the one or more buttons is configured to activate a pre-loaded visible piece of content which is presented on the scoreboard display device, wherein the pre-loaded visible piece of content includes at least one of a video, an image, or motion graphics;

a camera device configured to retrieve still frame or motion video, wherein the camera device is configured to include time stamp information with each still frame or motion video captured by the camera device, the camera device further configured to retrieve still frame or motion video of the scoreboard display device when an advertisement appears on the scoreboard display device, wherein the camera device is configured to capture the still frame or motion video of the advertisement upon detection in a change from a first advertisement to a second advertisement; and a second camera device configured to capture motion video of a competition and presented to the cloud-based server device, wherein the second camera device is configured to include time stamp information with the motion video captured by the second camera device, wherein the initiator device including the computing device, the computing device of the initiator device including the processor configured to execute one or more instructions configuring the computing device of the initiator device to present the input graphical user interface for receipt of the game-related information by the user, the one or more instructions including instructions for providing an alert to the user to take an action based upon an aspect of the game-related information, the aspect of the game related information including an end of a time period and the action includes presenting at least one button that includes at least one option to activate an appropriate video, image, or motion graphics on the display based on the end of a time period.

2. The system as claimed in claim 1, further comprising:
a receiver device, the receiver device including a computing device, the computing device of the receiver device including a processor configured to execute one or more instructions configuring the computing device of the receiver device to receive the game-related information from the cloud-based server device.

3. The system as claimed in claim 2, wherein the receiver device, including the computing device including the processor configured to execute the one or more instructions configuring the computing device of the receiver device to receive the game-related information from the cloud-based server device, further includes a graphical user interface for receipt of input information from a viewer regarding a subset of the game-related information desired to be viewed by the viewer.

4. The system as claimed in claim 1, further comprising a second initiator device operably connected to the scoreboard display device and the cloud-based server device, the second initiator device including a computing device, the computing device of the second initiator device including a processor configured to execute one or more instructions configuring the computing device of the second initiator device to present another input graphical user interface for receipt of the game-related information by another user.

5. The system as claimed in claim 4, wherein the initiator device including the computing device, the computing device of the initiator device including the processor configured to execute the one or more instructions configuring the computing device of the initiator device to present the input graphical user interface for receipt of the game-related information by the user, further including:
the input graphical user interface including time and score information related to a game.

6. The system as claimed in claim 4, wherein the second initiator device including the computing device, the computing device of the second initiator device including the processor configured to execute the one or more instructions configuring the computing device of the second initiator device to present the another input graphical user interface for receipt of game-related information by the another user, further including:
the another input graphical user interface including individual player statistics related to the game.

7. The system as claimed in claim 1, further comprising a third initiator device operably connected to the scoreboard display device and the cloud-based server device, the third initiator device including a housing distinct from the initiator device and a computing device, the computing device of the third initiator device including a processor configured to execute one or more instructions configuring the computing device of the third initiator device to present additional content for display on said scoreboard display device.

8. The system as claimed in claim 7, wherein the third initiator device including the computing device, the computing device of the third initiator device including the processor configured to execute the one or more instructions configuring the computing device of the third initiator device to present additional content for display on said scoreboard display device, further including:
a content graphical user interface for selection of individual pieces of additional content from the cloud-based server device for presentation in a pre-defined area of the scoreboard display device.

9. The system as claimed in claim 1, wherein the initiator device including the computing device, the computing device of the initiator device including the processor configured to execute the one or more instructions configuring the computing device of the initiator device to present the input graphical user interface for receipt of the game-related information by the user is operably connected to said scoreboard display device via a hard-wired connection.

10. The system as claimed in claim 1, wherein the initiator device including the computing device, the computing device of the initiator device including the processor configured to execute the one or more instructions configuring the computing device of the initiator device to present the input graphical user interface for receipt of the game-related information by the user is operably connected to said scoreboard display device via a wireless connection.

11. The system as claimed in claim 10, wherein the wireless connection is a BLUETOOTH connection or WIFI connection.

12. The system as claimed in claim 1, further comprising:
an auxiliary display device operably connected to the cloud-based server device configured to present game-related information from the initiator device.

13. The system as claimed in claim 1, further comprising:
an aid device, the aid device operably connected to the initiator device and the cloud-based server device, the aid device including a computing device, the computing device of the aid device including a processor configured to execute one or more instructions configuring the computing device of the aid device to present the game-related information from the initiator device.

14. The system as claimed in claim 13, wherein the aid device operably connected to the initiator device and the cloud-based server device, the aid device including the computing device, the computing device of the aid device including the processor configured to execute the one or more instructions configuring the computing device of the aid device to present the game-related information is a wearable device.

15. The system as claimed in claim 2, wherein the receiver device including the computing device, the computing device of the receiver device including the processor configured to execute the one or more instructions configuring the computing device of the receiver device to receive the game-related information from the cloud-based server device, the one or more instructions including receiving an input information from the viewer and transmitting the input information to the cloud-based server device.

16. A system for presenting game-related information, comprising:
an initiator device, the initiator device including a computing device, the computing device including a processor configured to execute one or more instructions configuring the computing device of the initiator device to present an input graphical user interface for receipt of game-related information by a user, the one or more instructions including instructions for providing an alert to the user to take an action based upon an aspect of the game-related information, each piece of game-related information including time-stamp information;

a scoreboard display device for a gym or arena, the scoreboard display device operably coupled to said initiator device, the scoreboard display device configured to present game-related information from the initiator device;

a cloud-based server device operably connected to the initiator device, the cloud-based server device configured for receipt and storage of each piece of the game-related information with the time-stamp information, wherein other game-related information associated with particular time-stamp information is configured to be retrieved from the cloud-based storage device;

a receiver device, the receiver device including a computing device, the computing device of the receiver device including a processor configured to execute one or more instructions configuring the computing device of the receiver device to receive the game-related information from the cloud-based server device, wherein the input graphical user interface of the initiator device includes one or more buttons, wherein each button of the one or more buttons is configured to activate a pre-loaded visible piece of content which is presented on the scoreboard display device, wherein the pre-loaded visible piece of content includes at least one of a video, an image, or motion graphics;

a camera device configured to retrieve still frame or motion video, wherein the camera device is configured to include time stamp information with each still frame or motion video captured by the camera device, the camera device further configured to retrieve still frame or motion video of the scoreboard display device when an advertisement appears on the scoreboard display device, wherein the camera device is configured to capture the still frame or motion video of the advertisement upon detection in a change from a first advertisement to a second advertisement; and a second camera device configured to capture motion video of a competition and presented to the cloud-based server device, wherein the second camera device is configured to include time stamp information with the motion video captured by the second camera device, wherein the initiator device including the computing device, the computing device of the initiator device including the processor configured to execute one or more instructions configuring the computing device of the initiator device to present the input graphical user interface for receipt of the game-related information by the user, the one or more instructions including instructions for providing an alert to the user to take an action based upon an aspect of the game-related information, the aspect of the game related information including an end of a time period and the action includes presenting at least one button that includes at least one option to activate an appropriate video, image, or motion graphics on the display based on the end of a time period.

17. The system as claimed in claim 16, further comprising:

a producer device, the producer device operably coupled to said cloud-based
server device and said scoreboard display device, the producer device including a computing device, the computing device of the producer device including a processor configured to execute one or more instructions configuring the computing device of the producer device to select visible advertising content from the cloud-based server device and present the selected visible advertising content on the scoreboard display device.

18. The system as claimed in claim 17, wherein the receiver device is configured to provide at least one of photos or videos to the cloud-based server device.

19. The system as claimed in claim 18, wherein the producer device is configured to select the at least one of photos or videos provided by the receiver device from the cloud-based server device and present the selected one of photos of videos on the scoreboard display device.

20. The system as claimed in claim 1, wherein the camera device is configured to transfer the still frame or motion video of the second advertisement upon detection in a change from a first advertisement to a second advertisement to the cloud-based server device to allow generation of a report of instances of when the second advertisement actually appeared on the scoreboard display device.

* * * * *